United States Patent

Harada et al.

[11] Patent Number: 6,083,549
[45] Date of Patent: *Jul. 4, 2000

[54] TASTE-IMPROVING AGENT AND A FOOD HAVING IMPROVED TASTE

[75] Inventors: Tsutomu Harada; Mitsuo Kamada, both of Kawasaki, Japan

[73] Assignee: Ajinomoto Co., Inc., Tokyo, Japan

[ * ] Notice: This patent is subject to a terminal disclaimer.

[21] Appl. No.: 08/695,725

[22] Filed: Aug. 12, 1996

Related U.S. Application Data

[63] Continuation-in-part of application No. 08/504,136, Jul. 19, 1995, Pat. No. 5,688,546.

[30] Foreign Application Priority Data

Aug. 11, 1995 [JP] Japan .................................. 7-205824

[51] Int. Cl.$^7$ ...................................... A23L 1/236
[52] U.S. Cl. .......................... 426/548; 426/534; 426/536; 426/537; 426/650; 426/656

[58] Field of Search ..................................... 426/548, 534, 426/536, 537, 650, 656

[56] References Cited

U.S. PATENT DOCUMENTS 5,688,546  11/1997  Shima et al. ............................. 426/534

FOREIGN PATENT DOCUMENTS 0 699 667 A1  6/1996  European Pat. Off. .

*Primary Examiner*—Leslie Wong
*Attorney, Agent, or Firm*—Oblon, Spivak, McClelland, Maier & Neustadt, P.C.

[57] ABSTRACT

The bitterness, astringency and persistent sweetness possessed commonly by intense sweeteners may be reduced to afford a lightly sweet aftertaste, by the addition of an amino acid derivative such as N-(1-methyl-4-oxo-2-imidazolin-2-yl)alanine or analogues thereof.

19 Claims, 4 Drawing Sheets

TASTE-IMPROVING AGENT AND A FOOD HAVING IMPROVED TASTE

REFERENCE TO RELATED APPLICATIONS

This application is a continuation-in-part of application Ser. No. 08/504,136, filed Jul. 19, 1995, now U.S. Pat. No. 5,688,546.

BACKGROUND OF THE INVENTION

1. Field of the Invention

The present invention relates to materials which improve the taste quality, especially the aftertaste characteristics, of various foods, and to foods having an improved aftertaste.

2. Discussion of the Background

The taste of a food varies depending on the types of taste components contained therein, and various improvements have been attempted when foods were found to have complicated or unpleasant tastes. Among the low-calorie sweeteners that have been increasingly used, intense sweeteners, such as, for example, Aspartame, are characterized in that they are free from a bitter, astringent or stimulating taste and have a light refreshing sweetness. However, it has a somewhat less full-bodied sweetness, and, as characteristically experienced with the intense sweeteners, it tends to impart a persistent sweet aftertaste.

With regard to the improvement of such sweetness characteristics of Aspartame, various proposals have been made (Unexamined Japanese Patent Applications S52-90667, S56-148255, S57-63068, S58-141760, and S64-63356). Nevertheless, such proposed methods are not effective enough for improving the sweetness characteristics of Aspartame or to imbue it with a satisfactory sweetness comparable with that of powder sugar. In addition, such methods employing various taste components concomitantly involve the use of Aspartame in a weight amount equal to or more than those of the concomitant components, and it is desirable that the methods be further improved also in view of caloric reduction or wider application.

On the other hand, other intense sweeteners, such as saccharin, cyclo, stevia inverted sugar products, Acesulfame K and the like, have a high bitter-astringency. Foods containing such sweeteners exhibit unfavorable mouthfeel even after swallowing, and the unpleasant aftertaste tends to affect the entire character of the taste, so that overall improvement from instant taste through aftertaste is required.

Thus, there remains a need for agents and methods which are effective for improving the taste properties of intense sweeteners. There also remains a need for foods which contain such an intense sweetener and such an agent.

SUMMARY OF THE INVENTION

Accordingly, it is one object of the present invention to provide novel agents useful for improving the taste properties of intense sweeteners.

It is another object of the present invention to provide novel agents which are useful for reducing an undesirable aftertaste of an intense sweetener.

It is another object of the present invention to provide a novel method for improving the taste properties of intense sweeteners.

It is another object of the present invention to provide a novel method for reducing an undesirable aftertaste of an intense sweetener.

It is another object of the present invention to provide a novel method for reducing a bitter, astringent and unpleasant aftertaste characteristic of intense sweeteners.

It is another object of the present invention to provide novel food compositions which contain an intense sweetener and such an agent.

These and other objects, which will become apparent during the following detailed description, have been achieved by the inventors' discovery that a fraction having (i) an improved and refreshing, light sweetness; (ii) a reduced persistent sweetness, bitterness and astringency experienced commonly in intense sweeteners; and (iii) a suppressed sustained aftertaste, can be isolated from a beef hot-water extract using a dialysis membrane, an electrophoresis membrane, gel filtration chromatography, partition chromatography, reverse-phase chromatography, and the inventors' isolation of a novel amino acid derivative of formula (I) and having the below-mentioned properties.

Thus, by adding such a novel amino acid derivative in a trace amount to a target food in which an intense sweetener is contained, any unpleasant aftertaste of the target food is eliminated without modifying the favorable organoleptic properties, the physical state or the number of calories, resulting in a highly palatable food.

In addition, such novel amino acid derivatives of formula (I) can successfully be obtained by chemical synthesis using commercial reagents as starting materials through a chemical synthesis method or by mixing and heating such commercial reagents.

The compound of formula (I) can be represented as any one of three tautomeric structures, which are depicted as structural formulae (1), (2), and (3).

Molecular weight: 185
Molecular formula: $C_7H_{11}N_3O_3$

Structural formula:

(1) N-(1-methyl-4-oxo-2-imidazolin-2-yl)alanine

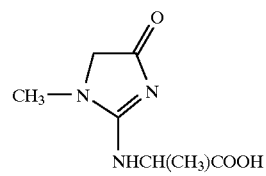

(Ia)

Structural formula:

(2) N-(1-methyl-4-oxo-imidazolidin-2,2-ylidene)alanine

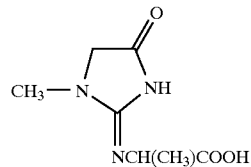

(Ib)

Structural formula:

(3) N-(1-methyl-4-hydroxy-3-imidazolin-2,2-ylidene) alanine (Ic)

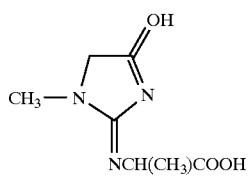

In addition, when the isolated novel amino acid derivative fraction was concentrated, admixed with an alcohol and allowed to stand at room temperature, it was observed that a colorless transparent laminar crystal was formed, and X-ray crystal structure analysis revealed that the compound of formula (I) was isomerized into the compound of formula (II) upon crystallization.

The compound of formula (II) can be represented by any one of three tautomeric structures, which are depicted as structural formulae (4), (5), and (6).

Structural formula:

(4) N-(5-methyl-4-oxo-1-imidazolin-2-yl)sarcosine (IIa)

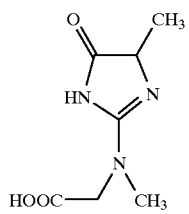

Structural formula:

(5) N-(4-methyl-5-oxo-1-imidazolin-2-yl)sarcosine (IIb)

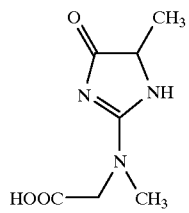

Structural formula:

(6) N-(4-methyl-5-hydroxy-2,5-imidazol-2-yl)sarcosine (IIc)

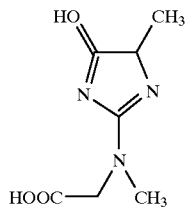

It was also confirmed that, in solution, the compound of formula (I) undergoes partial ring opening by hydrolysis, resulting in the compound of formula (III), which can be represented by any one of two tautomeric structures which are depicted as structural formulae (7) and (8).

Structural formula:

(7) N-[1-(N-carboxymethyl-N-methyl)amino-1-iminomethyl]alanine (IIIa)

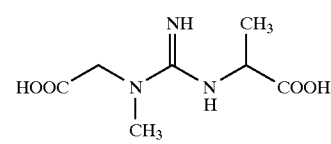

Structural formula:

(8) N,N-[1-(N-carboxymethyl-N-methyl)amino-1-aminomethylidene]alanine (IIIb)

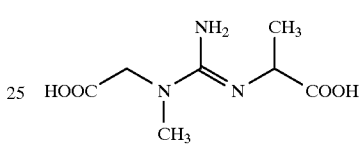

It has been proven that, unlike other known taste-improving materials, the compounds of formulae (I), (II), and (III) according to the present invention, when added in trace amounts to various foods which are low in calories but have an unpleasant aftertaste due to the intense sweeteners contained therein, reduce the aftertaste of the persistent sweetness, suppress the bitterness and astringency, and enable the modification towards a light, refreshing sweetness.

Accordingly, the present invention relates to a food containing a novel amino acid derivative represented by general formulae (I), (II), (III), or (IV) (for example, structural formulas (1), (2), (3), (4),(5), (6), (7), and (8)) together with an intense sweetener.

The general structures for the compounds of formulae (I), (II), (III), and (IV) are shown below.

(I)

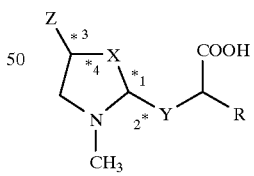

wherein

X and Y are each N or NH,

Z is O or OH;

(1) when X=N and Y=NH, then Z=O and *1 and *3 are double bonds;

(2) when X=NH and Y=N, then Z=O and *2 and *3 are double bonds;

(3) X=N and Y=N, then Z=OH and *2 and *4 are double bonds; and

R is selected from the group consisting of H, $CH_3$, $CH_2CH_2COOH$, $CH_2CH_2CH_2CH_2NH_2$, and $CH_2CH_2CH_2CH_3$;

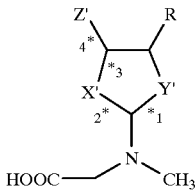
(II)

wherein

X' and Y' are each N or NH,

Z' is O or OH;

(1) when X'=NH and Y'=N, then Z'=O and *1 and *4 are double bonds;

(2) when X'=N and Y'=NH, then Z'=O and *2 and *4 are double bonds;

(3) X'=N and Y'=N, then Z'=OH and *1 and *3 are double bonds; and

R is selected from the group consisting of H, $CH_3$, $CH_2CH_2COOH$, $CH_2CH_2CH_2CH_2NH_2$, and $CH_2CH_2CH_2CH_3$;

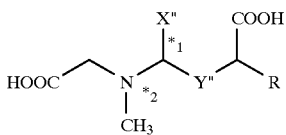
(III)

wherein

X" and Y" are each $NH_2$ or NH;

(1) when X"=$NH_2$ and Y"=N, then *2 is a double bond;

(2) when X"=NH and Y"=NH, then *1 is a double bond; and

R is selected from the group consisting of H, $CH_3$, $CH_2CH_2COOH$, $CH_2CH_2CH_2CH_2NH_2$, and $CH_2CH_2CH_2CH_3$; and

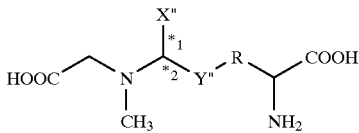
(IV)

wherein

X" and Y" are each $NH_2$ or NH;

(1) when X"=$NH_2$ and Y"=N, then *2 is a double bond;

(2) when X"=NH and Y"=NH, then *1 is a double bond; and,

R is selected from the group consisting of —$COCH_2$—, —$COCH_2CH_2$—, —$C(NH)NHCH_2CH_2CH_2$—, and —$CH_2CH_2CH_2CH_2$—.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
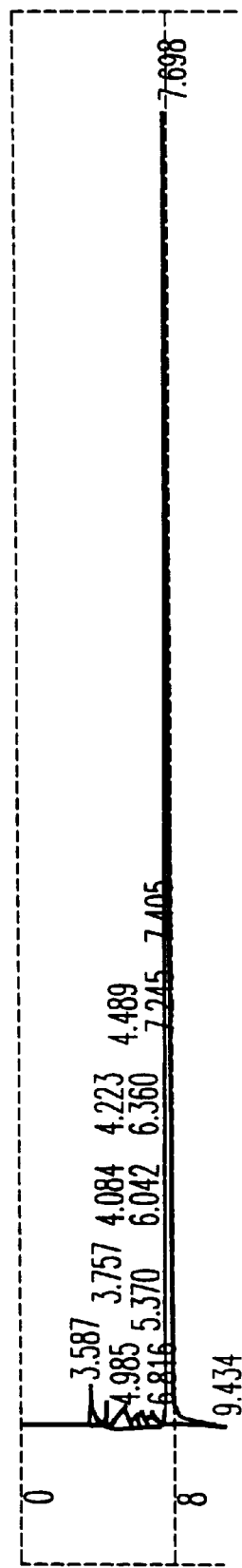
FIG. 1 is an Ultron VX-ODS column chromatographic chart of an isolated sample obtained in the Preparation Example.

By adding the novel amino acid derivative according to the present invention to an intense sweetener mentioned above or a food containing such a sweetener, persistent sweetness, bitterness and astringency experienced commonly with existing intense sweeteners can be reduced, and such an aftertaste can be suppressed, thereby providing a method enabling the modification towards an intense sweetener having a light, refreshing sweetness as well as a method of producing a low-calorie food utilizing such a high-quality intense sweetener.

The intense sweetener mentioned herein refers to a sweetener having a sweetness of 10 to 1000 times greater than that of a powder sugar, such as saccharin (1,2-benzisothiazol-3(2H)-one 1,1-dioxide), Aspartame (N-L-α-aspartyl-L-phenylalnine methyl ester), glycyrrhizin (20β-carboxy-11-oxo-30-norolean-12-en-3β-yl-2-O-β-D-glucopyranuronosyl-α-D-glucopyranosiduronic acid), stevioside, Thaumatin, rebaudioside, sodium cyclamate (sodium cyclohexylsulfamic acid), Acesulfame K (postassium salt of 6-methyl-1,2,3-oxathiazine-4(3H)-one-2,2-dioxide, and the like. These sweeteners commonly possess a bitter and astringent taste in addition to sweetness, and have a persistent bitter and astringent taste even after swallowing the food.

In one example of the method of obtaining a novel amino acid derivative having a taste-improving effect on intense sweeteners, a beef extract obtained by treatment with water or hot water is subjected to centrifugation or filtration to remove sediments, dregs and fats, and then the extract is placed in a bag of a commercial cellulose dialysis membrane, which is then allowed to stand in tap water overnight, whereby the high molecular materials are removed, and then the permeating fluid is treated with an electric dialysis membrane or various columns having separation modes such as gel filtration, partition and reverse-phase separation, whereby obtaining the novel amino acid derivative mentioned above is obtained. It is also a matter of course that creatinine and alanine can be employed as the starting materials to obtain the inventive amino acid derivative by synthesis. The isolation and synthesis of the compounds of formulae (I), (II), (III), or (IV) are also disclosed in U.S. patent application Ser. No. 08/504,136 filed on Jul. 19, 1995, JP-A-143551/1996, and EP-A-0 699 677, all of which are incorporated herein by reference in their entirety.

It was found that when the amino acid derivative of formulae (I), (II), (III), or (IV) thus obtained which has an taste-improving effect on intense sweeteners and has a molecular weight of 185 or higher is added to Aspartame, Acesulfame K, stevia, cyclo, saccharin, rebaudioside and the like, the persistent sweetness, bitterness and astringency which are the common defects of these intense sweeteners can be reduced and such an aftertaste remaining for a prolonged period can be eliminated, thereby providing an intense sweetener having a light refreshing sweetness and no bitter or astringent taste, the sweetness of which is completely different from that of the conventional intense sweeteners.

Although the optimum range of the concentration of a novel amino acid derivative of formulae (I), (II), (III), or (IV) required for the improvement of intense sweeteners varies depending on the foods or sweeteners to which the novel amino acid derivative is added, a concentration of from 0.001 to 0.100 wt. %, preferably 0.005 to 0.05 wt. %, (solid weight) based on the weight of the intense sweetener is generally preferable for the purpose of reducing the persistent sweetness and intense bitterness and astringency which are the common defects of conventional intense sweeteners thereby imparting an aftertaste of a lightly refreshing sweetness and modifying the taste to be balanced and refreshing. The novel amino acid derivative of formulae (I), (II), (III), or (IV) may be added to a food which already contains an intense sweetener or may be premixed with the intense sweetener. The compound of formulae (I), (II), (III), or (IV) may be added to the food or sweetener as a powder or in solution.

The novel amino acid derivative capable of reducing the persistent unpleasant aftertaste has a potent sweetness-imparting function, and can be utilized as a seasoning in various processed foods, nutrient foods and medical diets and may contribute to the efficient utilization of veterinary and fishery resources. It may be added as it is or in the form of a solution, for example, in water.

The methods of obtaining the novel amino acid derivatives of formulae (I), (II), (III), or (IV) capable of reducing the unpleasant aftertaste of intense sweeteners as mentioned above and determining their structures as well as the effect observed when they are added to an intense sweetener are described in the following examples, which are not intended to restrict the present invention in any way.

EXAMPLES

Preparation Example 1

Extraction

Approximately 6 kg of a beef shank meat were cut into cubes of from approximately 5 to 10 cm, charged into a 30-liter cylindrical aluminum pot, and boiled at from 90 to 95° C. for approximately 7 hours with the addition of 8 liters of water to obtain approximately 5 liters of a hot-water extract. The beef and precipitate formed were removed from the hot-water extract, and the residual extract was then refrigerated overnight. The oils, fats and precipitate formed during the refrigeration were further removed through a 60-mesh sieve. Further, the fine precipitate and solids were removed by a Sharples-type ultracentrifuge (15,000 rpm; manufactured by Nakamura Denki Seisakusho). The brown transparent supernatant obtained by the centrifugation was freeze-dried. The freeze-dried powder was dissolved in water to a concentration of 8 g/dl, and high-molecular substances were fully removed by means of an ultrafiltration membrane (fraction molecular weight=10,000). The thus-obtained low-molecular fraction solution was treated with an electrodialysis membrane (microdialyzer G3 manufactured by Asahi Chemical Industry Co., Ltd., membrane pore diameter molecular weight=approximately 1,000). The obtained outer solution (molecular weight=approximately 1,000 or less) was further treated with an electrodialysis membrane (membrane pore diameter molecular weight= approximately 100) to obtain an inner solution fraction which was a fraction of a beef hot-water extract having a molecular weight of from approximately 100 to 1,000. The resulting solution was powdered by freeze-drying. In the treatment with the electrodialysis membrane, the point at which the conductivity and the current value of the dialyzate became zero was defined as the final point.

The thus-obtained fraction of the beef, hot-water extract having the molecular weight of from approximately 100 to 1,000 was subjected to various analytical methods such as gel filtration chromatography (Sephadex G-25 column, 50×540 mm, made by Pharmacia Biotek, eluent: 20 mM-ammonium acetate), partition chromatography (HPLC, TSKgel Carbon 500 column, 21.5×150 mm, manufactured by Tosoh Corp., eluent: 0.05% TFA→0.05% TFA/acetonitrile=50/50 gradient), and reverse-phase chromatography (HPLC, Capcellpak C18 UG120 column, 20×250 mm, manufactured by Shiseido Co., Ltd., eluent: 0.05% TFA→0.05% TFA/acetonitrile=50/50, gradient) to isolate the component capable of reducing the aftertaste of persistent sweetness, bitterness and astringency.

The purity of the collected substance was measured by reverse-phase chromatography (HPLC, Ultron VX-ODS column, 4.6×250 mm, manufactured by Shinwa Kako K.K., eluent: 0.05% TFA→0.05% TFA/acetonitrile=50/50 gradient). As a result, the substance was found to be consisting of almost a single compound.

Analysis Example

The physicochemical properties of the substance that reduces the unpleasant aftertaste as obtained in Preparation Example mentioned above are as follows. Results of analysis of molecular weight:

The novel amino acid derivative obtained from the beef, hot-water extract by the method mentioned above has the following properties.

Figure 2:
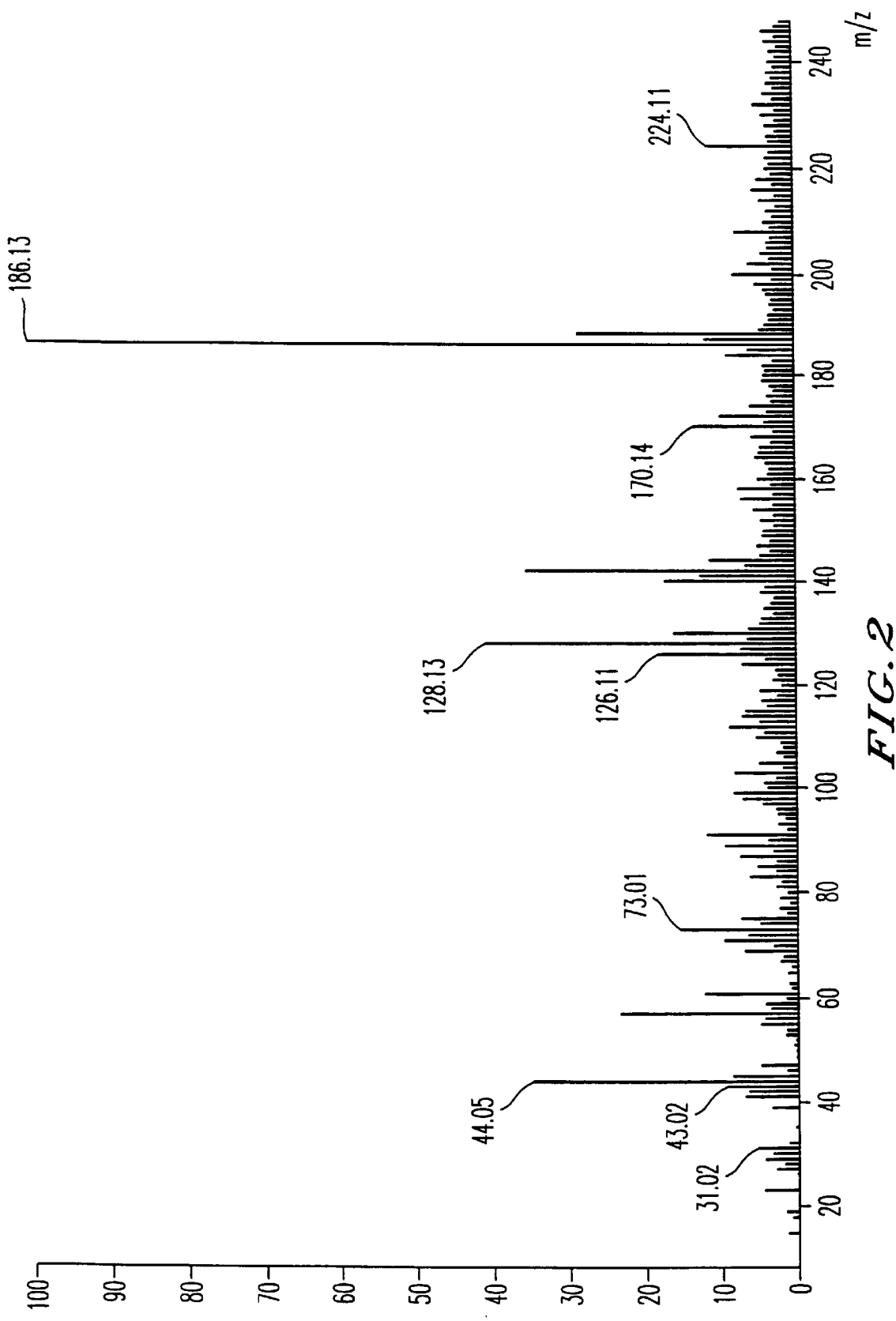
FIG. 2 is a FAB-MS chart of the isolated sample obtained in the Preparation Example.

The molecular weight of the compound was found to be 185 as measured by fast atom bombardment analysis (hereinafter abbreviated as "FAB-MS"), and the results are shown in FIG. 2.

Results of analysis of molecular formula

Figure 3:
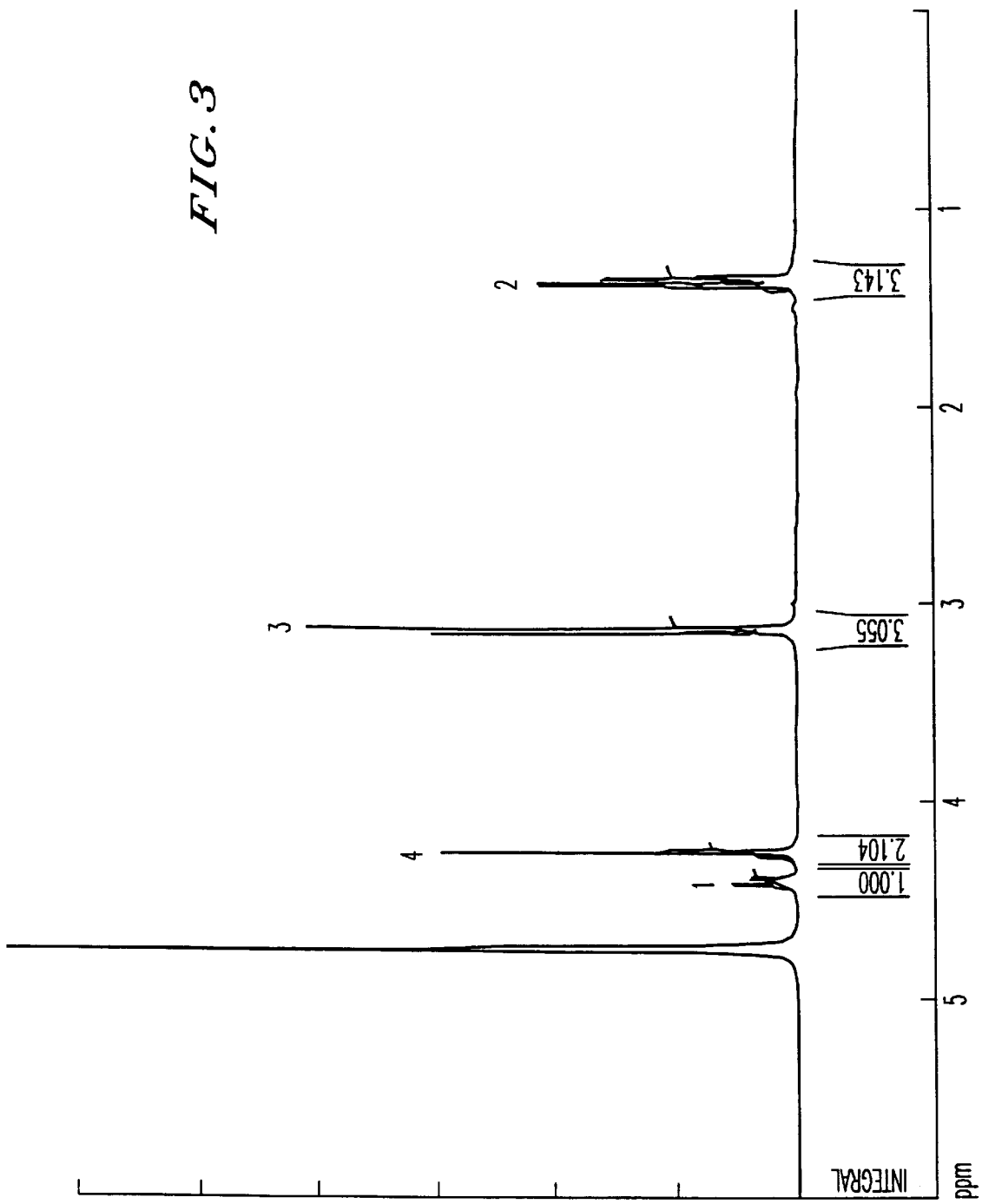
FIG. 3 is a $^1$H-NMR spectrum of the isolated sample obtained in the Preparation Example (pH=approximately 2)
Figure 4:
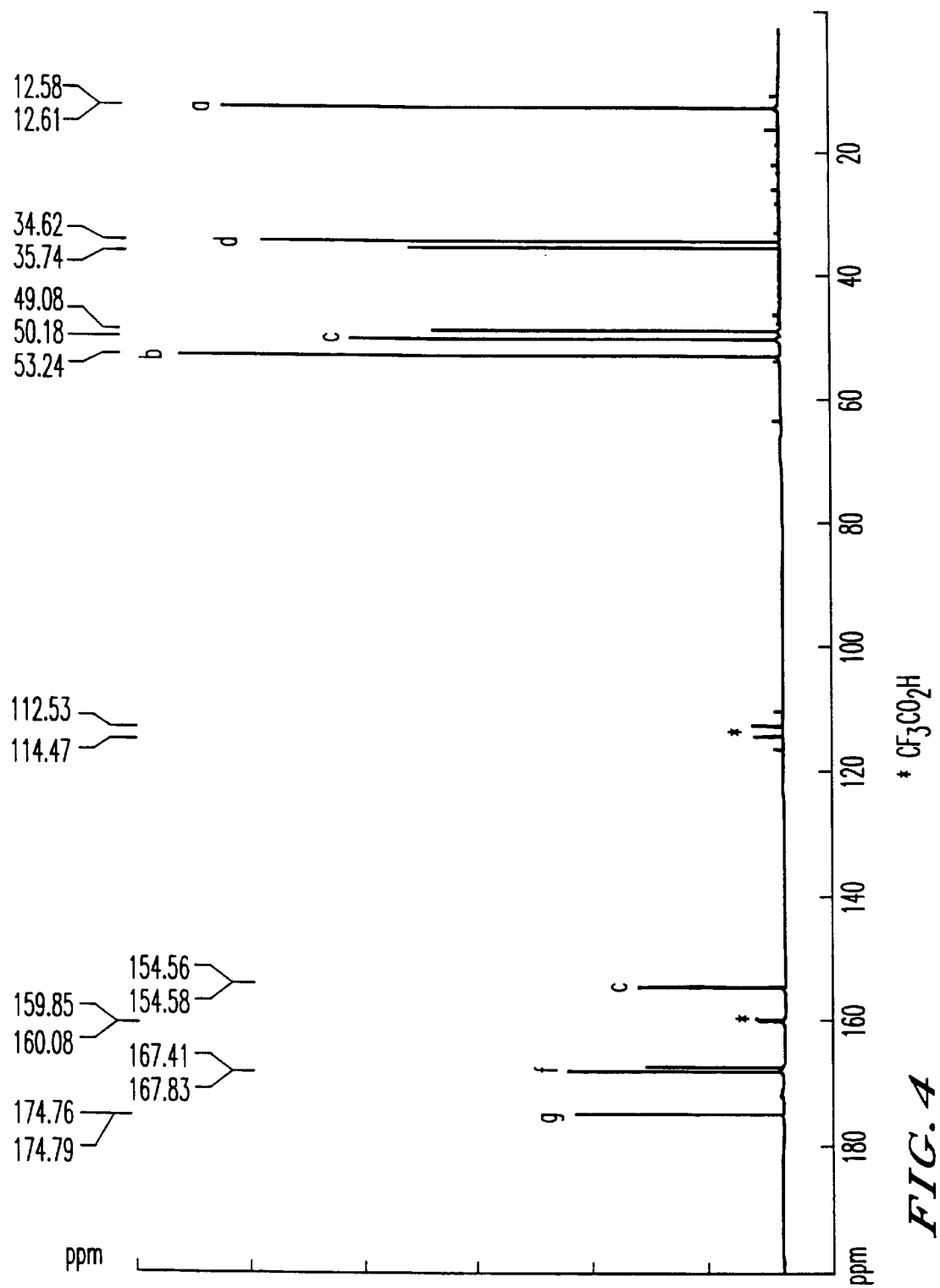
FIG. 4 is a $^{13}$C-NMR spectrum of the isolated sample obtained in the Preparation Example (pH=approximately 2).

The molecular formula of the compound was determined to be $C_7H_{11}N_3O_3$ as measured by $^1$H-NMR and $^{13}$C-NMR, and the results are shown in FIGS. 3 and 4, respectively.

Results of analysis of structural formula

From the results of measurement by $^1$H-NMR and $^{13}$C-NMR, it was presumed that a skeleton of alanine or lactic acid was present and a skeleton similar to that of creatinine was present.

The novel amino acid derivative was considered to be a condensed structure of the two moieties mentioned above as measured by heteronuclear mutual remote bonding correlation (HMBC) analysis, and structures (1), (2) and (3) described above were presumed. The compound of the present invention was found to be a set of structural isomers as measured using the NMR spectrum.

When the present compounds were searched via the structure reference system (REG FILE), it was found that no compounds having these structure were known, proving that they were entirely novel amino acid derivatives.

Results of analysis of X-ray crystal structure

Methyl alcohol was added to the concentrated solution of the compound of the present invention in an amount of approximately 4 times, and the mixture was allowed to stand at room temperature. A few days later, colorless transparent laminar crystals precipitated, and the mixture was then filtered under reduced pressure to collect crystals. The crystals were subjected to X-ray crystal structure analysis. As a result, the crystals were found to have the structures (4), (5), and (6), described above. That is, it was found that the structures (1), (2), and (3) were changed into the structures (6), (7), and (8) of the structural isomers by the crystallization.

Taste function evaluation

The taste-improving function of the novel amino acid derivative obtained as described above was evaluated using Aspartame. Thus, 0.11 g of Aspartame (made by Ajinomoto Co., Inc.) was diluted with distilled water to form a solution of 100 ml (having a sweetness corresponding to 10% based on powder sugar), to which 50 mg (2.7 mM) of the novel amino acid derivative (a condensate of creatinine with alanine) was added. A sample to which 30.5 mg (2.7 mM) of creatinine and 24.1 mg (2.7 mM) of alanine were added simultaneously was evaluated similarly. Employing a non-supplemented sample as a control, a taste profile evaluation was conducted by eight trained panelists.

As a result, it was found that the novel amino acid derivative suppressed the sustained sweetness of Aspartame, and had the function of modifying it significantly so that it has a light, refreshing sweetness, as shown in Table 1. Such a function was not observed when creatinine and alanine were added.

TABLE 1

Effect of addition of novel amino acid on Aspartame taste.

| Sample | Taste profile |
|---|---|
| Aspartame aqueous solution (control) | Heavy full-bodied sweetness, sustained sweet aftertaste |
| Aspartame plus Novel amino acid derivative | Light, refreshing sweetness, aftertaste disappeared soon, light aftertaste |
| Aspartame plus Creatinine + Alanine | Sweeter than control, heavy sweetness having body basically similar to control, slightly better, persistent sweetness |

Evaluation of taste function

Similarly, the effect of the addition of the novel amino acid derivative on commercial intense sweeteners was evaluated.

Commercially available saccharin sodium (made by Yamada Seiyaku), α-G-Sweet (Steviocide inverted sugar product: made by Toyo Seito), Sunett (Acesulfame K: made by Hoechst) and sodium cyclosulfamate (made by Tokyo Kasei Kogyo) were each placed in 100 ml volumetric flasks in the amounts of 0.11 g, 0.10 g, 0.21 g, and 0.33 g, respectively, to which distilled water was added to form solutions of 100 ml each (having sweetness of 10% based on powder sugar). 50 mg of the novel amino acid derivative (condensate of creatinine with alanine) was then added to each solution. Employing a non-supplemented sample as a control, a taste profile evaluation was conducted by eight trained panelists.

The results shown in Table 2 indicate that the addition of the novel amino acid eliminated almost all bitterness and astringency, reduced the sweet, bitter and astringent aftertaste, and modified the taste to have a light, refreshing sweetness.

TABLE 2

Effect of addition of novel amino acid on commercial intense sweeteners.

| Sample | Control taste profile | Taste profile of novel amino acid derivative-supplemented sample |
|---|---|---|
| Saccharin Sodium | Persistent aftertaste of bitterness | Reduced bitterness, sweet aftertaste became light and refreshing |
| α-G-Sweet (steviocide) | Astringency and bitterness | Astringency and bitterness disappeared, sweetness became light and refreshing |
| Sunett (Acesulfame K) | Intense bitterness and astringency, which persisted | Astringency disappeared, and bitterness was reduced, light taste |
| Sodium cyclohexyl-sulfamate | Strong aftertaste, light sweetness disappearing shortly | Strong bitter taste disappeared, no aftertaste |

Preparation Example 2

Chemical synthesis

Seventy grams of reagent creatinine (made by Nacalai Tesque Co.) and 114 ml of reagent methyl-2-bromopropionate (made by Merck Japan) were used as starting materials, and approximately 15 grams of the novel amino acid compound were obtained as schematically shown below. The structure of the obtained compound was analyzed by FAB-MS, $^1$H-NMR and $^{13}$C-NMR as mentioned above, and was then found to be the same as the structure of the compound obtained from the beef, hot-water extract. At this time, the yield of the compound was approximately 12 mol %.

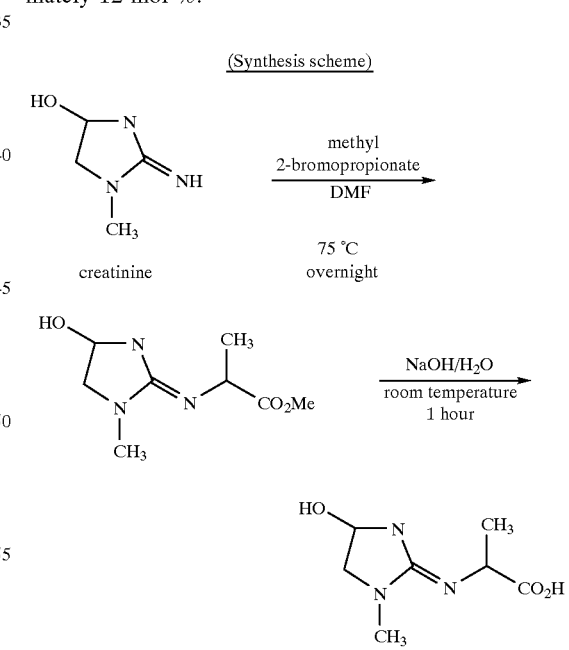

In this process, a novel derivative of alanine was synthesized from 2-bromomethyl propionate as a starting material, while the novel derivatives of glycine, lysine, glutamic acid and leucine were synthesized similarly from ethyl bromoacetate, methyl ε-benzoylamino-α-chlorocaprate, methyl α-chloroglutarate and methyl α-bromoisocaprate, respectively, as starting materials.

Preparation Example 2

Heat formation

A 0.5M solution of reagent creatinine (made by Nacalai Tesque Co.) and a 0.5M solution of alanine (made by Ajinomoto Co., Inc.) were heated at a pH of 10 for 30 hours. The obtained reaction solution was treated with a DEAE TOYOPEARL (11.2 cm×20 cm) column to remove unreacted creatinine and alanine. At this time, the eluent was 20 mM ammonium acetate, the flow rate was 18.5 ml/min, and the detection was conducted with an absorbance at 280 nm. The content of the novel amino acid derivative in each fraction was analyzed by a Carbon 500 column. Further, the fraction containing this novel amino acid derivative was collected and concentrated. Subsequently, the novel amino acid derivative was singly collected by means of a Carbon 500 column for collection. The structure of the obtained compound was analyzed by FAB-MS, $^1$H-NMR and $^{13}$C-NMR, as mentioned above, and it was found to be the same as that of the compound obtained from the beef, hot-water extract.

Taste function evaluation

Any of the novel amino acid derivatives prepared by the chemical synthesis and heat formation was proven to have a taste function similar to that of the novel amino acid derivative isolated from the beef hot-water extract.

By adding the novel amino acid derivative according to the invention to the intense sweetener mentioned above or a processed food containing such sweetener, the persistent sweetness, bitterness and astringency experienced with such existing intense sweeteners can be suppressed, and such aftertaste can be reduced, whereby providing an intense sweetener having a sweetness of high quality.

This application is based on Japanese Patent Application No. 205824/1995, filed on Aug. 11, 1995, and which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for improving the taste of an intense sweetener, comprising adding to said intense sweetener or a food containing said intense sweetener a taste improving effective amount of a compound having a structure selected from the group consisting of formulae (I), (II), (III), or (IV):

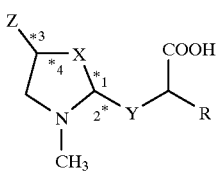

(I)

wherein

X and Y are each N or NH,

Z is O or OH;

(1) when X=N and Y=NH, then Z=O and *1 and *3 are double bonds;

(2) when X=NH and Y=N, then Z=O and *2 and *3 are double bonds;

(3) X=N and Y=N, then Z=OH and *2 and *4 are double bonds; and

R is selected from the group consisting of H, CH$_3$, CH$_2$CH$_2$COOH, CH$_2$CH$_2$CH$_2$CH$_2$NH$_2$, and CH$_2$CH$_2$CH$_2$CH$_3$;

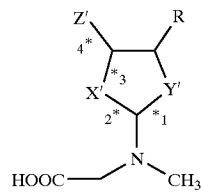

(II)

wherein

X' and Y' are each N or NH,

Z' is O or OH;

(1) when X'=NH and Y'=N, then Z'=O and *1 and *4 are double bonds;

(2) when X'=N and Y'=NH, then Z'=O and *2 and *4 are double bonds;

(3) X'=N and Y'=N, then Z'=OH and *1 and *3 are double bonds; and

R is selected from the group consisting of H, CH$_3$, CH$_2$CH$_2$COOH, CH$_2$CH$_2$CH$_2$CH$_2$NH$_2$, and CH$_2$CH$_2$CH$_2$CH$_3$;

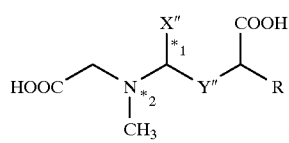

(III)

wherein

X" and Y" are each NH$_2$ or NH;

(1) when X"=NH$_2$ and Y"=N, then *2 is a double bond;

(2) when X"=NH and Y"=NH, then *1 is a double bond; and

R is selected from the group consisting of H, CH$_3$, CH$_2$CH$_2$COOH, CH$_2$CH$_2$CH$_2$CH$_2$NH$_2$, and CH$_2$CH$_2$CH$_2$CH$_3$; and

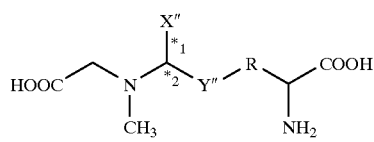

(IV)

wherein

X" and Y" are each NH$_2$ or NH;

(1) when X"=NH$_2$ and Y"=N, then *2 is a double bond;

(2) when X"=NH and Y"=NH, then *1 is a double bond; and

R is selected from the group consisting of —COCH$_2$—, —COCH$_2$CH$_2$—, —C(NH)NHCH$_2$CH$_2$CH$_2$—, and —CH$_2$CH$_2$CH$_2$CH$_2$—.

2. The method of claim 1, wherein said compound has the structure of formula (I):

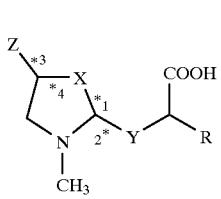

(I)

wherein
X and Y are each N or NH,
Z is O or OH;
(1) when X=N and Y=NH, then Z=O and *1 and *3 are double bonds;
(2) when X=NH and Y=N, then Z=O and *2 and *3 are double bonds;
(3) X=N and Y=N, then Z=OH and *2 and *4 are double bonds; and
R is selected from the group consisting of H, CH$_3$, CH$_2$CH$_2$COOH, CH$_2$CH$_2$CH$_2$CH$_2$NH$_2$, and CH$_2$CH$_2$CH$_2$CH$_3$.

3. The method of claim 2, wherein said intense sweetener is selected from the group consisting of N-L-α-aspartyl-L-phenylalanine methyl ester, 1,2-benzisothiazol-3(2H)-one 1,1-dioxide, sodium cyclohexylsulfamic acid, steviocide, and the potassium salt of 6-methyl-1,2,3-oxathiazine-4(3H)-one-2,2-dioxide.

4. The method of claim 2, wherein said compound is added in an amount of 0.001 to 0.1 wt. %, based on the weight of said intense sweetener.

5. The method of claim 1, wherein said compound has the structure of formula (II):

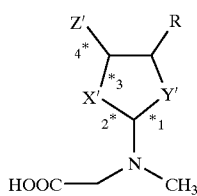

(II)

wherein
X' and Y' are each N or NH,
Z' is O or OH;
(1) when X'=NH and Y'=N, then Z'=O and *1 and *4 are double bonds;
(2) when X'=N and Y'=NH, then Z'=O and *2 and *4 are double bonds;
(3) X'=N and Y'=N, then Z'=OH and *1 and *3 are double bonds; and
R is selected from the group consisting of H, CH$_3$, CH$_2$CH$_2$COOH, CH$_2$CH$_2$CH$_2$CH$_2$NH$_2$, and CH$_2$CH$_2$CH$_2$CH$_3$.

6. The method of claim 5, wherein said intense sweetener is selected from the group consisting of N-L-α-aspartyl-L-phenylalanine methyl ester, 1,2-benzisothiazol-3(2H)-one 1,1-dioxide, sodium cyclohexylsulfamic acid, steviocide, and the potassium salt of 6-methyl-1,2,3-oxathiazine-4(3H)-one-2,2-dioxide.

7. The method of claim 5, wherein said compound is added in an amount of 0.001 to 0.1 wt. %, based on the weight of said intense sweetener.

8. The method of claim 1, wherein said compound has the structure of formula (III)

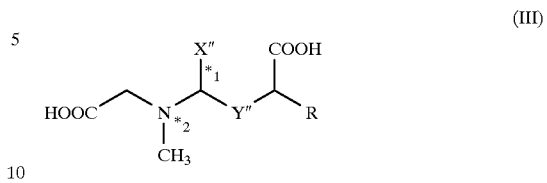

(III)

wherein
X" and Y" are each NH$_2$ or NH;
(1) when X"=NH$_2$ and Y" N, then *2 is a double bond;
(2) when X"=NH and Y"=NH, then *1 is a double bond; and
R is selected from the group consisting of H, CH$_3$, CH$_2$CH$_2$COOH, CH$_2$CH$_2$CH$_2$CH$_2$NH$_2$, and CH$_2$CH$_2$CH$_2$CH$_3$.

9. The method of claim 8, wherein said intense sweetener is selected from the group consisting of N-L-α-aspartyl-L-phenylalanine methyl ester, 1,2-benzisothiazol-3(2H)-one 1,1-dioxide, sodium cyclohexylsulfamic acid, steviocide, and the potassium salt of 6-methyl-1,2,3-oxathiazine-4(3H)-one-2,2-dioxide.

10. The method of claim 8, wherein said compound is added in an amount of 0.001 to 0.1 wt. %, based on the weight of said intense sweetener.

11. The method of claim 1, wherein said compound has the structure of formula (IV)

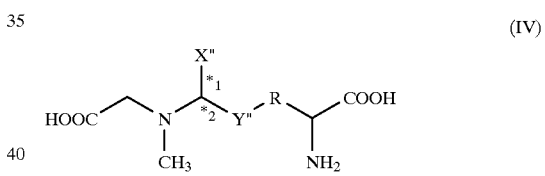

(IV)

wherein
X" and Y" are each NH$_2$ or NH;
(1) when X"=NH$_2$ and Y"=N, then *2 is a double bond;
(2) when X"=NH and Y"=NH, then *1 is a double bond; and
R is selected from the group consisting of —COCH$_2$—, —COCH$_2$CH$_2$—, —C(NH)NHCH$_2$CH$_2$CH$_2$—, and —CH$_2$CH$_2$CH$_2$CH$_2$—.

12. The method of claim 11, wherein said intense sweetener is selected from the group consisting of N-L-α-aspartyl-L-phenylalanine methyl ester, 1,2-benzisothiazol-3(2H)-one 1,1-dioxide, sodium cyclohexylsulfamic acid, steviocide, and the potassium salt of 6-methyl-1,2,3-oxathiazine-4(3H)-one-2,2-dioxide.

13. The method of claim 11, wherein said compound is added in an amount of 0.001 to 0.1 wt. %, based on the weight of said intense sweetener.

14. A composition, comprising one or more sweet, bitter and astringent components and a taste improving effective amount of a compound having a formula selected from the group consisting of formula (I), formula (II), formula (III), and formula (IV):

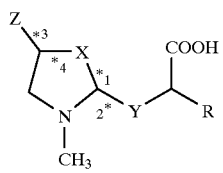
(I)

wherein

X and Y are each N or NH,

Z is O or OH;

(1) when X=N and Y=NH, then Z=O and *1 and *3 are double bonds;
(2) when X=NH and Y=N, then Z=O and *2 and *3 are double bonds;
(3) X=N and Y=N, then Z=OH and *2 and *4 are double bonds; and R is selected from the group consisting of H, $CH_3$, $CH_2CH_2COOH$, $CH_2CH_2CH_2CH_2NH_2$, and $CH_2CH_2CH_2CH_3$;

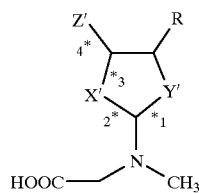
(II)

wherein

X' and Y' are each N or NH,

Z' is O or OH;

(1) when X'=NH and Y'=N, then Z'=O and *1 and *4 are double bonds;
(2) when X'=N and Y'=NH, then Z'=O and *2 and *4 are double bonds;
(3) X'=N and Y'=N, then Z'=OH and *1 and *3 are double bonds; and R is selected from the group consisting of H, $CH_3$, $CH_2CH_2COOH$, $CH_2CH_2CH_2CH_2NH_2$, and $CH_2CH_2CH_2CH_3$;

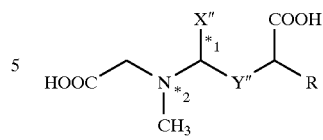
(III)

wherein

X" and Y" are each $NH_2$ or NH;

(1) when X"=$NH_2$ and Y"=N, then *2 is a double bond;
(2) when X"=NH and Y"=NH, then *1 is a double bond; and R is selected from the group consisting of H, $CH_3$, $CH_2CH_2COOH$, $CH_2CH_2CH_2CH_2NH_2$, and $CH_2CH_2CH_2CH_3$; and

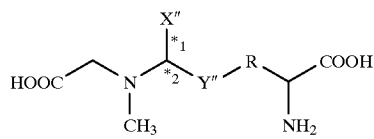
(IV)

wherein

X" and Y" are each $NH_2$ or NH;

(1) when X"=$NH_2$ and Y"=N, then *2 is a double bond;
(2) when X"=NH and Y"=NH, then *1 is a double bond; and R is selected from the group consisting of —$COCH_2$—, —$COCH_2CH_2$—, —$C(NH)NHCH_2CH_2CH_2$—, and —$CH_2CH_2CH_2CH_2$—.

15. The composition of claim 14, wherein said component is a sweetener or a sweetened food.

16. The composition of claim 15, wherein said sweetener or sweetened food contains an intense sweetener.

17. The composition of claim 16, wherein said intense sweetener is selected from the group consisting of N-L-α-aspartyl-L-phenylalanine methyl ester, 1,2-benzisothiazol-3(2H)-one 1,1-dioxide, sodium cyclohexylsulfamic acid, steviocide, and the potassium salt of 6-methyl-1,2,3-oxathiazine-4(3H)-one-2,2-dioxide.

18. The composition of claim 17, wherein said compound is present in an amount from 0.001 to 0.1% by weight, based on the weight of said intense sweetener.

19. The composition of claim 16, wherein said intense sweetener is N-L-α-aspartyl-L-phenylalanine methyl ester.

* * * * *